United States Patent Office 3,264,124
Patented August 2, 1966

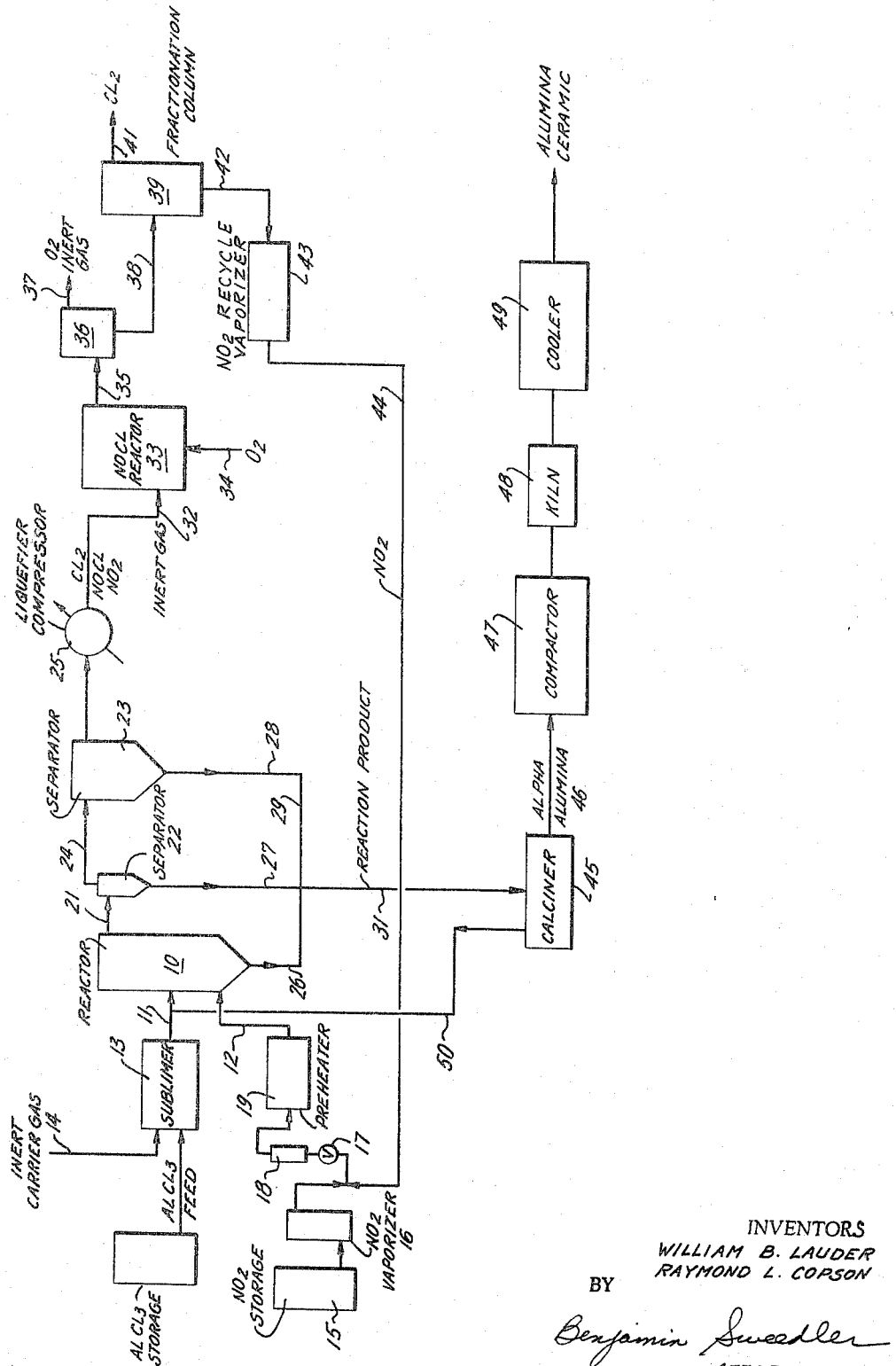

3,264,124
PRODUCTION OF ULTRA-FINE ALPHA ALUMINA AND SUCH ALPHA ALUMINA
William B. Lauder and Raymond L. Copson, Syracuse, N.Y., assignors to Allied Chemical Corporation, New York, N.Y., a corporation of New York
Filed Nov. 21, 1963, Ser. No. 325,412
8 Claims. (Cl. 106—65)

This invention relates to the production of alpha alumina and, more particularly, to the production of a novel form of alpha alumina having desirable properties rendering it eminently satisfactory for use in producing ceramic products and for other uses. This invention includes (a) the processes of producing such alpha alumina; (b) the processes involving the additional steps required for producing ceramic products; (c) the resultant novel alpha alumina; and (d) the resultant novel ceramic products.

Aluminum oxide, i.e., alpha alumina, generally is produced by calcination of hydrated alumina derived from bauxite. Alpha alumina is widely used in making special ceramics requiring high strength, refractoriness, hardness, good thermal shock resistance, and low dielectric loss factor. Typical applications of such ceramics are in spark plug insulators and vacuum tube envelopes.

In the production of ceramics from the best grades of alpha alumina heretofore available, it is generally necessary to compress the alpha alumina particles under pressures of the order of 90,000 p.s.i. or higher and fire the compressed material at a temperature of about 3100° F. or higher to form the ceramic bodies.

It is a principal object of the present invention to provide relatively low temperature processes for producing alpha alumina having a unique combination of desirable properties, namely, ultra-fine particle size, high surface area, and high reactivity as compared with heretofore known alpha alumina. The alpha alumina of this invention is eminently satisfactory for use in producing ceramic products; the advantageous properties result in better ceramic products, particularly ceramic products of improved density.

It is another object of this invention to provide a process of producing such ceramic products of improved density.

Still another object of ths invention is to provide a novel alpha alumina of micron or sub-micron particle size, high surface area and especially high reactivity.

A further object of this invention is to provide ceramics made from alpha alumina, which ceramics are of improved density.

All percentages and parts in this specification are given on a weight basis.

In accordance with this invention, anhydrous aluminum chloride in the vapor phase is reacted at a temperature within the range of from 175° C. to 500° C., preferably 200° C. to 300° C., with nitrogen dioxide employing at least about the stoichiometric amount of nitrogen dioxide to convert the aluminum chloride to aluminum oxide. Preferably an excess of from 20% to 40% nitrogen dioxide over and above this stoichiometric amount is used. Under these reaction conditions a completely amorphous product (determined by X-ray diffraction) results containing from 1 to 2.5 mols of $Al_2O_3$ per mol of AlOCl.

This solid amorphous reaction product, upon heating to a temperature above 900° C., desirably about 1100° C. or higher, preferably from 1200° C. to 1400° C., the higher the temperature the shorter the heating time, is converted substantially completely to alpha alumina of ultra-fine particle size. The heating at any given temperature disclosed should be discontinued when the desired ultra-fine particle size is obtained to prevent further crystal growth, i.e., growth of the particles. The unmilled alpha alumina product produced at 1200° to 1400° C. in about one hour has about 93% of a particle size less than 5 microns and at least half has a particle size less than 1 micron. The milled product is all less than 5 microns and about 70% less than 1 micron. The average alpha alumina particle size is between 0.05 and 0.6 micron.

The alpha alumina is of low bulk density, 0.208 g./cc. before settling as takes place upon tapping, and 0.415 g./cc. after tapping, and unusually high surface area and reactivity. Typical surface areas of the alpha alumina thus produced are 6.2 square meters per gram.

The alpha alumina thus produced can be compressed, desirably with a small portion of a suitable binder such as a wax binder, at pressures of from 60,000 to 110,000 p.s.i., and the compressed product fired at temperatures of from 1550° to 1700° C. to produce ceramics of exceptionally high density as compared with the density of ceramics made from alpha aluminas heretofore known, under substantially the same conditions or even under conditions of higher compression and higher firing temperatures.

The alumina chloride used can be the aluminum chloride of commerce; for example, it can be produced by chlorinating aluminum scrap, alumina or bauxite, or by other methods. If the aluminum chloride contains impurities, such as would contaminate the alpha alumina product, the aluminum chloride is purified by sublimation and fractional condensation of the vapors to obtain a relatively pure aluminum chloride. The aluminum chloride used should be anhydrous. The anhydrous aluminum chloride vapors introduced into the oxidation zone are produced by subliming the aluminum chloride by heating it to a temperature above its sublimination temperature under the pressure conditions at which the sublimation is effected. Alternatively, aluminum chloride vapors can be introduced directly into the reaction zone or aluminum chloride can be atomized in the liquid phase into the reaction zone and thus vaporized therein. When conducted as preferred, under atmospheric pressure conditions, the aluminum chloride is heated to a temperature of at least 178° C. Operating under vacuum conditions the temperature can be lower, depending on the vacuum used.

The nitrogen dioxide introduced into the reactor can be $NO_2$, or $N_2O_4$, or mixtures of $NO_2$ and $N_2O_4$; actually the nitrogen dioxide employed in the reaction is the equilibrium mixture of $NO_2$, $N_2O_4$, $NO$, and $O_2$ prevailing at the reaction temperature. Desirably, the nitrogen dioxide is preheated to reaction temperature before introduction into the reactor.

The amorphous reaction product thus produced is of ultra-fine particle size and contains appreciable amounts of chloride and some free chlorine. A typical analysis of this aluminum chloride reaction product showed 39.11% aluminum, 18.03% combined chlorine, 0.30% free chlorine, and 42.56% oxygen. Along with the solid reaction product, gaseous products are produced consisting chiefly of nitrosyl chloride and chlorine.

Theoretically, for every 4 mols of aluminum chloride converted to 2 mols of aluminum oxide, 6 mols of nitrosyl chloride and 3 mols of chlorine are produced. The solid aluminum oxychloride-oxide mixture constituting the reaction product is separated from the gaseous reaction products. The latter can be treated in known manner to oxidize the nitrosyl chloride to produce nitrogen dioxide and chlorine. The chlorine thus produced and that formed in the reaction with the aluminum chloride is recovered as a valuable by-product. The nitrogen dioxide can be recycled to the oxidizer for reaction with the aluminum chloride.

The ultra-fine solid reaction product, which is amorphous in character, is heated to a temperature above 900° C., desirably about 1100° C., preferably from 1200° to 1400° C., to decompose the aluminum oxychloride completely and to evolve the aluminum chloride formed in the decomposition. Heating can be effected in one or more stages or continuously in a kiln through which the ultra-fine particles move continuously and where they are heated to an exit temperature above 1200° C. The time of heating is inversely related to the temperature. The higher the temperature, the shorter the time. Typical analysis of a calcined product produced at 1300° C. by heating at this temperature for one hour showed it to be essentially pure alpha $Al_2O_3$, crystalline in character and containing 0.03% chloride.

The accompanying drawing is a flow sheet, showing diagrammatically one arrangement of equipment for practicing a preferred embodiment of this invention, namely, the production of alpha and alumina ceramics.

Referring to the drawing, the oxidizer reactor 10 is supplied with anhydrous aluminum chloride vapor and nitrogen dioxide through lines 11 and 12 respectively. Aluminum chloride is introduced into the sublimer 13 where it is sublimed. An inert carrier gas, preferably nitrogen, is introduced into the sublimer 13 through line 14 and the resultant mixture of carrier gas and anhydrous aluminum chloride vapors flow through line 11 into the oxidizer reactor 10. Liquid nitrogen dioxide is supplied from the storage tank 15 to a vaporizer 16 from which the vapors flow through a control valve 17, a flow indicator 18 and thence to the nitrogen dioxide preheater 19 communicating with line 12 leading into reactor 10.

Gaseous reaction products containing entrained reaction product leave the top of reactor 10 through line 21 and enter the cyclone separator 22 where initial separation of reaction product from the gases takes place. From the cyclone separator 22, the gas stream containing residual entrained reaction product flows to the bag separator 23 through line 24. From this bag separator 23, gases consisting chiefly of nitrosyl chloride, chlorine, nitrogen dioxide and inert carrier gas enter the liquefier-compressor 25.

Reaction product is withdrawn from the base of the reactor 10 through line 26, from the cyclone separator 22 through line 27, and from the bag separator 23 through line 28. These lines lead into manifold 29 provided with a discharge conduit 31 through which the reaction product is discharged for further treatment as hereinafter described.

Liquefier-compressor 25 effects liquefaction of the nitrosyl chloride, chlorine and nitrogen dioxide in the gaseous stream passing therethrough. The resultant mixture of liquid and inert gas flows through line 32 into the nitrosyl chloride reactor 33, which may be of the type disclosed in United States Patent 2,297,281, having an oxygen inlet 34 and communicating through line 35 with a condenser or cooler 36. In reactor 33 the nitrosyl chloride is oxidized under a pressure of from 150 to 1500 p.s.i.g. and at a temperature of from 50° to 100° C., as disclosed in United States Patent 2,297,281, to produce nitrogen dioxide and chlorine. The reaction products from reactor 33 enter the condenser 36 through line 35 where separation takes place of the oxygen and the inert gas, removed through line 37, from the liquid mixture of chlorine and nitrogen dioxide which flows through line 38 into the fractionating column 39. Here fractionation of this liquid mixture takes place; the chlorine is removed overhead through line 41. The nitrogen dioxide is removed through line 42 and enters the vaporizer 43 where vaporization is effected. The vapors flow through line 44 for recycle through the process.

Reactor 10 may be lined with or built from acid brick, ceramic material, glass stoneware or glazed steel, provided with a cooler, such as a jacket through which a suitable cooling medium is passed to maintain the reactor walls at a maximum temperature of 500° C., preferably 430° C. Other materials of construction resistant to corrosion under the prevailing conditions may, of course, be used. The filter bag in the bag separator 23 desirably is of polyester material, e.g., Dacron, or other filter medium not attacked by the reaction products.

The aluminum chloride vapor, inert carrier gas mixture leaves the sublimer 13 and enters the oxidizer 10 at a temperature of from 175° to 500° C., preferably 200° to 300° C. The nitrogen dioxide is preheated in preheater 19 to a temperature approximately the same as the inlet temperature of the aluminum chloride. The temperature in the reactor 10 is maintained within the range of from 175° to 500° C., preferably 200° to 300° C. The reactor 10 desirably is jacketed for circulation therethrough of a suitable cooling medium to maintain the desired reaction temperature; the reaction is exothermic and once started requires cooling to maintain the reaction temperature at the desired level.

The solid reaction product recovered from the reactor 10 and the separators 22 and 23 are introduced into a calciner 45 where they are heated to a temperature of from 1200° to 1400° C. to effect the removal of chloride and free chlorine to produce as the exit product discharged through line 46 alpha alumina of high surface area and high reactivity. The aluminum chloride formed upon decomposition of the aluminum oxychloride desirably is passed from the calciner through line 50 to the reactor 10.

In the embodiment of the invention involving the production of dense ceramic bodies, the alpha alumina discharged through 46 can be wet-ground, and the ground particles introduced into a conventional compactor 47 where the ultra-fine particles of alpha alumina in measured amounts, desirably with a suitable binder such as a wax binder, are compressed to form desired shapes depending upon the objects to be produced therefrom. Pressures of from 60,000 to 110,000 p.s.i. can be used. From the compactor or compressor 47 the compacted material is introduced into a firing oven or kiln 48 where they are subjected to firing temperatures of from 1550° to 1700° C. Ceramic alumina products thus formed are discharged through a cooler 49. Alternatively, the ceramics can be made by the known hot pressing techniques. The ceramics thus produced uniformly have a density of at least 90% of theoretical.

The following example is given to illustrate a preferred embodiment of this invention. It will be appreciated that the invention is not limited to this example. In the example the temperatures are given in degrees centigrade. As above noted, all percentages and parts are given on a weight basis.

*Example*

1100 parts of an anhydrous commercial grade aluminum chloride was sublimed in an electrically heated pot and swept by preheated nitrogen carrier gas into the reactor during one hour. The reactor was maintained at 250°, at which temperature reaction of the aluminum chloride vapor with nitrogen dioxide preheated to a temperature of 250° took place to form a mixture of aluminum oxide and oxychloride in the solid phase along with nitrosyl chloride and chlorine gas. 750 parts of nitrogen dioxide was introduced during this hour period as an upward flowing stream. The solid material formed was separated from the gaseous reaction products. 488 parts was thus obtained. Analysis of a sample of this product showed it contained 18.03% combined chloride, 0.3% free chlorine and 39.11% aluminum.

This product was heated for 3½ hours at 350°; a sample of the resultant product was analyzed and found to contain 10.75% total chlorine and 45.66% aluminum. This product was calcined at 900° and a sample of the calcined product analyzed. It was found to contain 0.57% total chlorine and 52.25% aluminum. Upon calcination at 1300° for one hour analysis showed the product contained 0.03% chloride and an aluminum and oxygen content corresponding to that of pure $Al_2O_3$. X-ray diffraction patterns showed the product obtained directly from the reactor to be completely amorphous. That calcined at 1300° for one hour was found to be essentially crystalline alpha alumina.

The particle size of the 1300° calcined product, as determined by the Andreason pipette method, was found to be:

|  | Unmilled Calcined Product, Percent | Milled Calcined Product, Percent |
| --- | --- | --- |
| >5μ | 93 | 100 |
| >3μ | 87 | 98 |
| >2μ | 82 | 92 |
| >1μ | 57 | 71 |

This milled calcined material was compared with a commercial grade of alumina (ALCOA A–10) commonly used in making special ceramics requiring high strength, refractoriness, hardness, thermal shock resistance, and low dielectric loss factor. The comparative test procedure was as follows:

100 grams of the alpha alumina was mixed with 60 ml. of a 5% beeswax solution in $CCl_4$ and the mixture first air-dried and then oven-dried at 80°. The alpha alumina of this invention was then compressed into pellets using a one-half inch diameter die in a laboratory hydraulic press at 75,000 p.s.i. pressure. The comparative alpha alumina required 94,000 p.s.i. for adequate compression. The pellets thus produced were fired at 1704° in 3¼ hours in a muffle furnace, and held at 1704° for an additional three hours. After removal from the furnace and cooling to room temperature, the pellets were tested for specific gravity and for percent open voids by a conventional water adsorption measurement. The data thus obtained are given below.

| Sample | Specific Gravity | | Specific Gravity | | Percent Open Voids After Heating |
| --- | --- | --- | --- | --- | --- |
|  | Before Heating | Percent of Theo. max. | After Heating | Percent of Theo. max. |  |
| Invention | 2.55 | 64 | 3.75 | 94 | 2.5 |
| Alcoa | 2.40 | 60 | 3.14 | 79 | 19 |

It is apparent from the above data that the ceramic made with the aluminum oxide of the present invention gives a denser product than obtainable with commercially available ceramic grade alumina powder when fired under the same conditions.

The alumina prepared by the process of this invention is of higher purity than many commercially available forms produced by prior known techniques; it is essentially free of sodium impurities commonly found in heretofore known commercial alumina. Because of its high purity, it is eminently satisfactory for use as a bedding material in the heat treatment of special alloy steels, particularly during annealing. Its freedom from sodium imparts better dielectric properties highly desirable in electronic uses of aluminum oxide ceramics.

Ceramics made from the alumina of the present invention, because of their improved density, show excellent durability as refractories under the severe service conditions encountered as nozzles, rocket nose-cones, tuyeres, pouring spouts for molten metals, and other such uses.

The alpha alumina of this invention has the surprising and unexpected property, due primarily to its high surface area, of adsorbing dyestuffs, such as Alizarin Red S, from aqueous solutions. Commercial alpha aluminas heretofore available do not have this property.

The refractory properties of the alpha alumina of this invention can be controlled by blending other metal oxides with the alpha alumina. Desirably this is accomplished by introducing into the reactor along with the aluminum chloride in the anhydrous vapor condition other metal chlorides or oxychlorides in anhydrous vapor condition and reacting the resultant mixture of metal chlorides or oxychlorides with the nitrogen dioxide to produce mixed oxide-oxychlorides which are calcined to form the mixed metal oxides. Thus mixtures of aluminum chloride with another metal chloride or oxychloride, such as vanadium oxychloride, boron chloride, or ferric chloride, containing up to about 6% to 10% and more of the other metal chloride or oxychloride have been reacted and the reaction product calcined to produce an alpha alumina containing the indicated percentage of the other oxide, which modified alpha alumina product when compressed and fired gives ceramics, the refractory and other properties of which are modified due to the presence of the other metal oxide. Generally the other metal oxide results in a small reduction in the refractoriness of the ceramics; the extent of the reduction is proportional to the amount of other metal oxide in the product.

Since certain changes in carrying out the process above described, and in the resultant alpha alumina and ceramics made therefrom, can be made without departing from the scope of this invention, it is intended that all matter contained in the above description or shown in the accompanying drawing shall be interpreted as illustrative and not in a limiting sense.

What is claimed is:
1. The process which comprises reacting aluminum chloride in the vapor phase with nitrogen dioxide in at least about the stoichiometric proportions for the reaction between the aluminum chloride and nitrogen dioxide to form aluminum oxide at a temperature within the range of from 175° to 500° C., at which temperature within said range an amorphous aluminum oxide-aluminum oxychloride reaction product in the solid phase results, recovering this solid reaction product and calcining the solid reaction product to convert it to essentially crystalline aluminum oxide.

2. The process as defined in claim 1, in which along with the aluminum chloride a second metal chloride selected from the group consisting of iron, boron and vanadium are reacted with the nitrogen dioxide to produce a mixture of metal oxides-metal oxychlorides in the solid phase, and the resultant mixure is recovered and calcined to produce a mixed aluminum and other metal oxide.

3. The process which comprises reacting aluminum chloride in the vapor phase with nitrogen dioxide in at least about the stoichiometric proportions for the reaction between the aluminum chloride and nitrogen dioxide to form aluminum oxide at a temperature of from 175° to 500° C. to produce an amorphous aluminum oxide-aluminum oxychloride solid reaction product containing from 1 to 2.5 mols of $Al_2O_3$ per mol of AlOCl, of ultrafine particle size, and recovering the solid reaction product.

4. The process as defined in claim 3, including the further step of heating the reaction product to a temperature of at least about 900° C. to produce crystalline alpha alumina.

5. The process of producing alpha alumina which comprises reacting aluminum chloride in the vapor phase under anhydrous conditions with nitrogen dioxide at a temperature within the range of from 175° to 500° C. in at least about the stoichiometric proportions for the reaction between the aluminum chloride and nitrogen dioxide to form aluminum oxide, separating the solid reaction product consisting essentially of a mixture of aluminum oxide and aluminum oxychloride from the gaseous reaction products, and heating the separated solid reaction product to a temperature of at least about 1100° C. to produce alpha alumina.

6. The process as defined in claim 5, in which an excess of from about 20% to 40% by weight of nitrogen dioxide over and above the stoichiometric amount required for reaction to produce aluminum oxide is employed.

7. The process as defined in claim 5, in which the heating of the reaction product produced is carried out at a temperature within the range of from 1200° to 1400° C.

8. The alpha alumina produced by the process of claim 5 having a particle size not exceeding 5 microns, a surface area of about 6.2 square meters per gram, a bulk density of about 0.208 g./cc. and being capable of adsorbing dyestuffs from aqueous solutions.

References Cited by the Examiner

UNITED STATES PATENTS

| | | | |
|---|---|---|---|
| 2,333,948 | 11/1943 | Muskat | 23—142 |
| 2,754,176 | 7/1956 | Kimberlin | 23—142 |
| 2,823,982 | 2/1958 | Saladin et al. | 23—142 |
| 3,026,210 | 3/1962 | Coble | 106—65 |
| 3,184,322 | 5/1965 | Parikh et al. | 106—59 |

TOBIAS E. LEVOW, *Primary Examiner.*

J. E. POER, *Assistant Examiner.*